Figure 1:
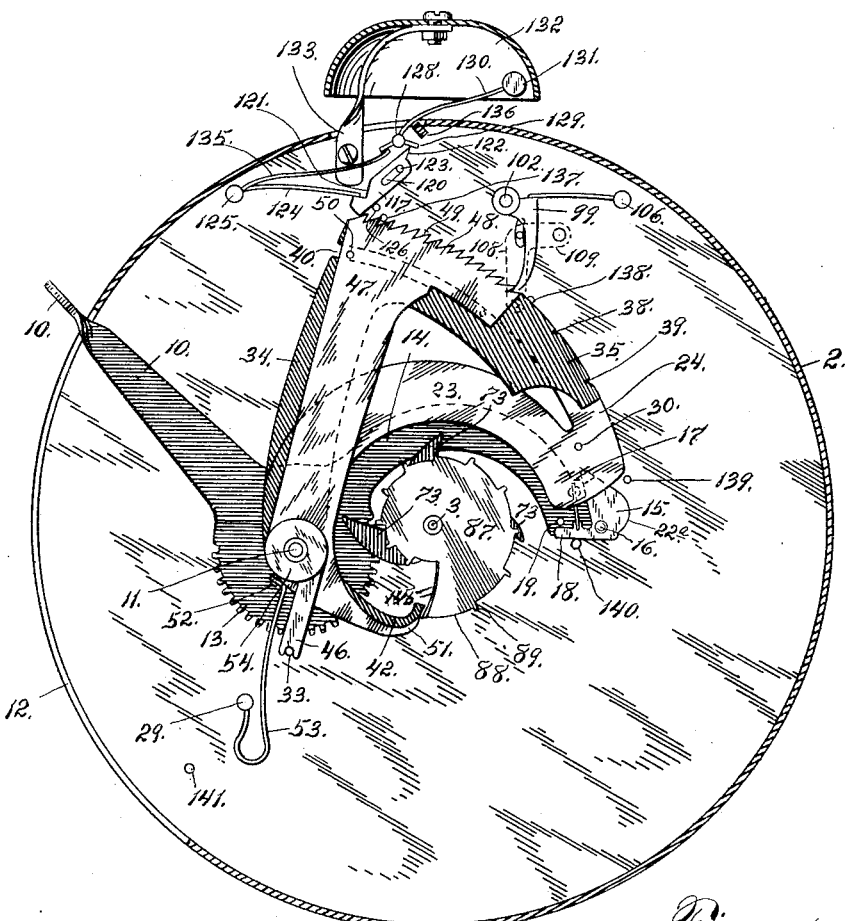

No. 662,904. Patented Dec. 4, 1900.
H. W. BAILEY & W. J. PARKINSON.
REPEATING MECHANISM FOR CLOCKS.
(Application filed Feb. 6, 1900.)

(No Model.) 4 Sheets—Sheet 1.

Witnesses:
George D. Burr
Conrad Seupold

Inventors
Harlow W. Bailey
William J. Parkinson
By W. T. Miller
Attorneys

No. 662,904. Patented Dec. 4, 1900.
H. W. BAILEY & W. J. PARKINSON.
REPEATING MECHANISM FOR CLOCKS.
(Application filed Feb. 6, 1900.)
(No Model.) 4 Sheets—Sheet 2.
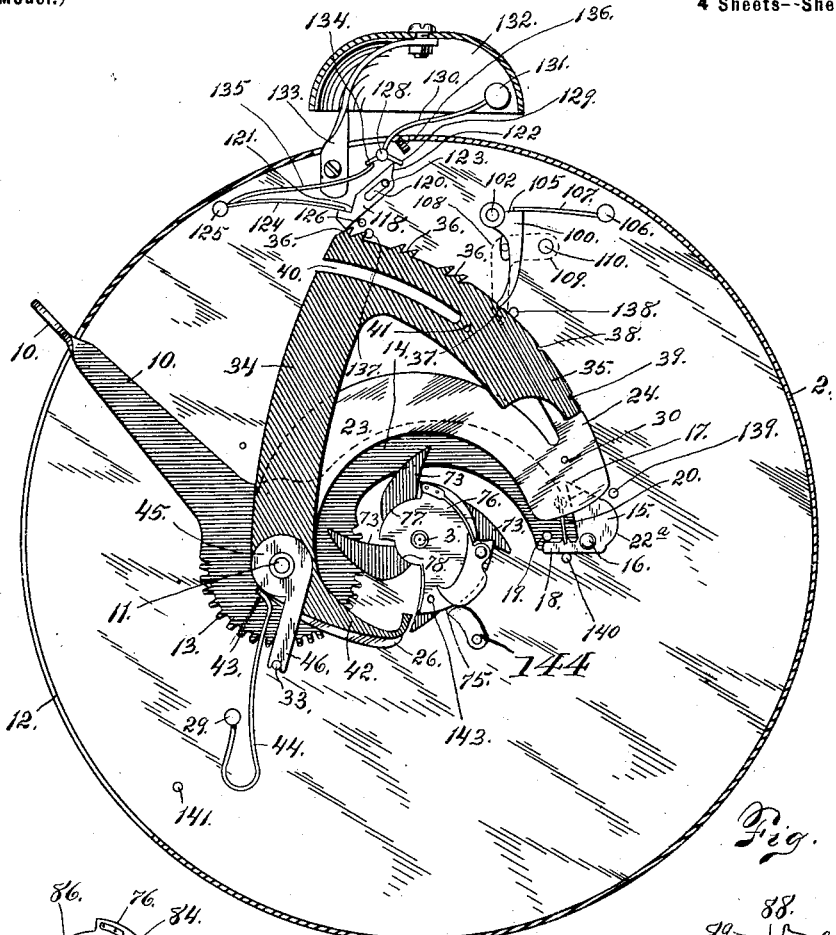
Fig. 2.
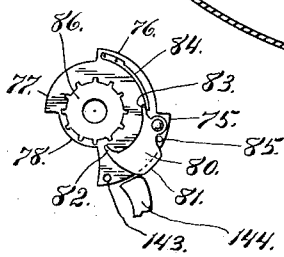
Fig. 7.
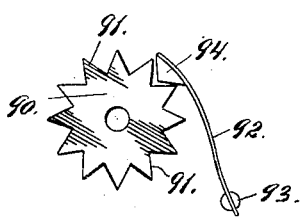
Fig. 12.
Fig. 6.
Witnesses:
Inventors,
Harlow W. Bailey
William J. Parkinson
By W. T. Miller
Attorney.

No. 662,904. Patented Dec. 4, 1900.
H. W. BAILEY & W. J. PARKINSON.
REPEATING MECHANISM FOR CLOCKS.
(Application filed Feb. 6, 1900.)
(No Model.) 4 Sheets—Sheet 3.
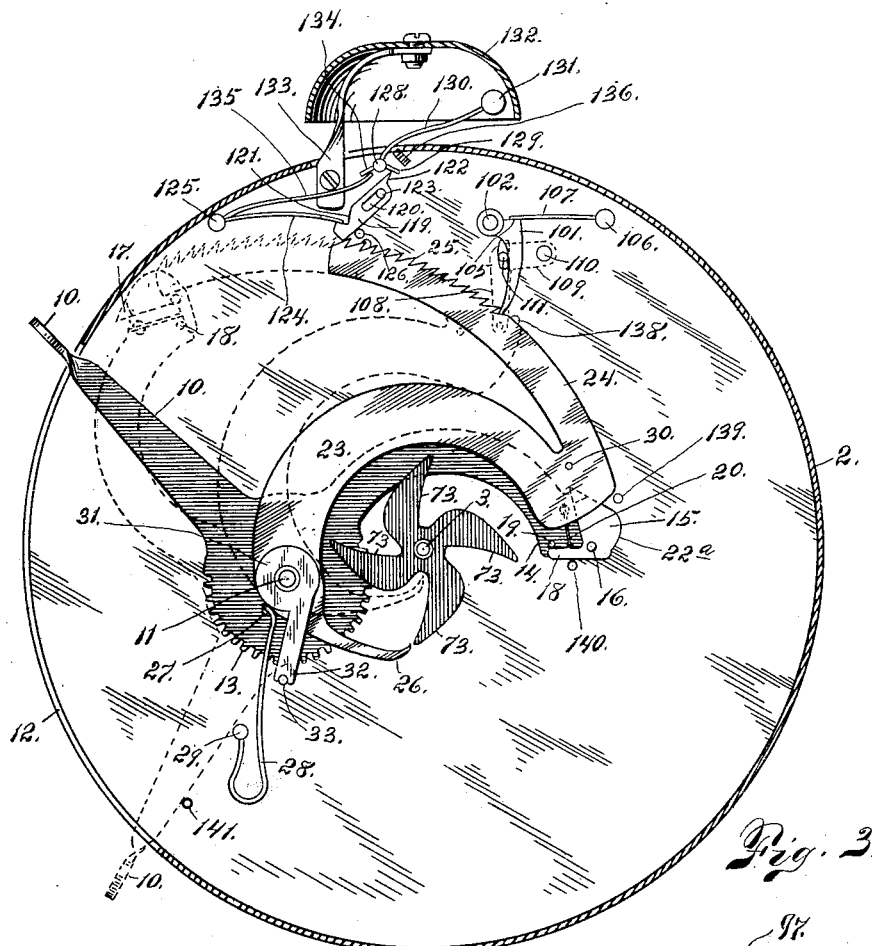
Fig. 3.
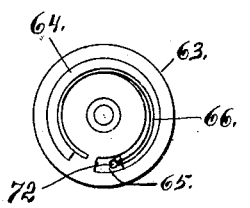
Fig. 13.
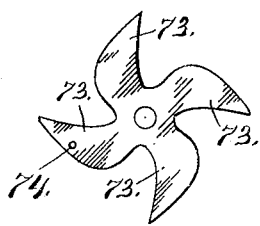
Fig. 8.
Fig. 14.
Witnesses:
George D. Burr
Conrad Leupold
Inventors.
Harlow W. Bailey
William J. Parkinson
By W. T. Miller
Attorney.
THE NORRIS PETERS CO., PHOTO-LITHO., WASHINGTON, D. C.

No. 662,904. Patented Dec. 4, 1900.
H. W. BAILEY & W. J. PARKINSON.
REPEATING MECHANISM FOR CLOCKS.
(Application filed Feb. 6, 1900.)
(No Model.) 4 Sheets—Sheet 4.

Witnesses: Inventors.
Harlow W. Bailey
William J. Parkinson
By W. T. Miller
Attorney.

United States Patent Office.

HARLOW W. BAILEY AND WILLIAM J. PARKINSON, OF BUFFALO, NEW YORK.

REPEATING MECHANISM FOR CLOCKS.

SPECIFICATION forming part of Letters Patent No. 662,904, dated December 4, 1900.

Application filed February 6, 1900. Serial No. 4,213. (No model.)

*To all whom it may concern:*

Be it known that we, HARLOW W. BAILEY and WILLIAM J. PARKINSON, citizens of the United States, residing at Buffalo, in the county of Erie and State of New York, have invented certain new and useful Improvements in Repeating Mechanism for Clocks and Watches; and we do hereby declare the following to be a full, clear, and exact description of the invention, such as will enable others skilled in the art to which it appertains to make and use the same, reference being had to the accompanying drawings, and to figures of reference marked thereon, which form a part of this specification.

Our invention relates to improvements in repeating mechanism for clocks, and more particularly to that class of repeating mechanism which effects the striking of the hour, the quarter, and the minute of the quarter.

The object of our invention is to effect the correct striking of the hour, the quarter, and the minute of the quarter at all times and under all conditions, in the sense of being entirely independent of gravity.

To that end our invention consists of a pivoted operating-lever carrying an integral segment-gear which winds the mainspring for moving the geared retarding-train, and an integral radial arm provided at its outer end with a spring-carrier, hour, quarter, and minute toothed segments pivoted on a common axis with the operating-lever and adapted for operative engagement with the spring-carrier, tails upon the inner ends of the toothed segments, hour, quarter, and minute cams pivoted upon the central clock-arbor and adapted for operative engagement with the tails upon the hour, quarter, and minute toothed segments, individual spring-pressed pawls for engaging and holding the toothed segments when not in operation, a releasing device for disengaging the spring-pawls from the toothed segments to permit them to operate, individual sliding and swinging spring-pressed hammer-trips adapted for operative engagement with the toothed segments, and the bell-hammer for audibly indicating the hour, quarter, and minute.

Our invention further consists in certain details of construction, all of which will be fully hereinafter described and claimed.

Figure 9:
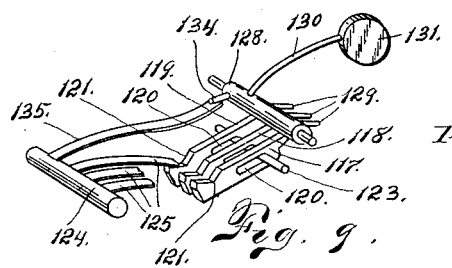
Figure 10:
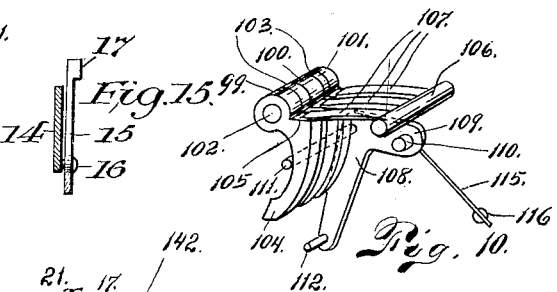
Figure 11:
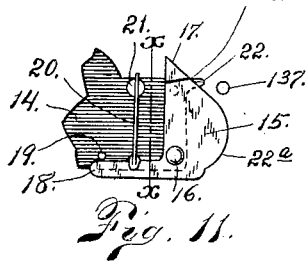
Figures 4, 5:
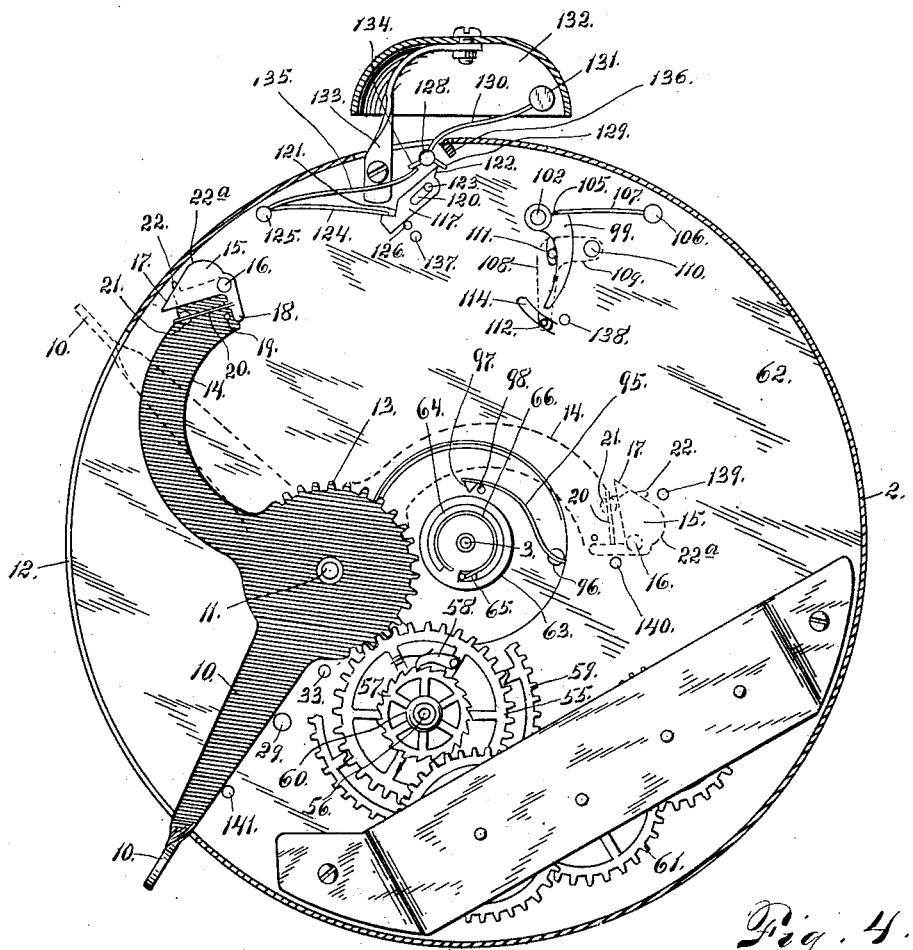

In the drawings, Figure 1 is a front elevation of our improved repeating mechanism with the mainspring and geared retarding-train removed. Fig. 2 is a view similar to Fig. 1, but with the hour toothed segment and hour-cam removed. Fig. 3 is a view similar to Fig. 2, but with the hour and quarter toothed segments and cams removed. Fig. 4 is a front elevation showing the operating-lever, its segment-gear, its integral radial arm provided with its spring-carrier, and the geared steadying-train, the three toothed segments and cams being removed. Fig. 5 is a transverse section through the central clock-arbor, showing relative position of parts. Figs. 6, 7, and 8 are detached detail views of the hour, quarter, and minute cams, respectively. Fig. 9 is a detached perspective view of the sliding spring-pressed hammer-trips. Fig. 10 is a similar view of the spring-pressed pawls and tripping-lever. Fig. 11 is a detached detail of the spring-carrier upon the radial arm of the operating-lever. Fig. 12 is a similar view of the star-wheel and its spring-pawl. Fig. 13 is a similar view of the spring-carrier for the hour, quarter, and minute cams. Fig. 14 is a similar view of the retarding-disk and its spring-pawl; and Fig. 15 is a transverse section of Fig. 11, taken in the line $x$ $x$.

Referring to the drawings, 1 (see Fig. 5) is a fragmentary portion of the clock-casing, and 2 the casing inclosing our improved repeating mechanism, which, as will be seen, can be applied to a complete clock, with a few minor changes in the motion-work—for instance, the auxiliary casing 2 can be added to the main casing 1, and the central arbor 3 of the clock proper can be extended sufficiently to carry certain portions of our repeating mechanism, as shown in Fig. 5. The hour-wheel 4, carrying the hour-hand 5, is mounted upon the extended arbor 3 within the casing 2 and in close proximity to the dial 6. The minute-hand 7 is mounted upon the projecting end of the central arbor 3. The minute-wheel pinion 8 is mounted upon its extended arbor 9 within the chamber 2 and intermeshes with the hour-wheel 4. The remainder of the clock mechanism (not shown) is undisturbed.

Our improved repeating mechanism is all arranged and operates within the casing 2. We will now proceed to describe such mechanism in detail.

10 is the operating-lever, pivoted upon the arbor 11. Its outer projecting end travels in the slot 12. Its inner or pivot end is enlarged and has formed upon it the segment-gear 13.

14 is an integral curved radial arm arranged at an obtuse angle to the lever 10. Its outer end has attached thereto a spring-carrier, arranged as follows:

15 is a thin plate pivoted at the point 16 upon the radial arm 14. (See Fig. 11.) One side of this plate tapers to a point, upon which is mounted the raised triangular carrier 17. (See Figs. 11 and 15.) Upon the other side of the plate 15 is the right-angled arm 18, which rests normally against the pin 19 upon the radial arm 14. A leaf-spring 20 has one end secured to the arm 18, its other free end passing loosely through the slotted post 21 upon the radial arm 14.

Spur 22 projects from the outer end of the radial arm 14 upon the side adjacent to the triangular carrier 17. The carrier 17 is thrown inwardly upon the pivot in operation and against the action of the leaf-spring 20, which restores it to its normal position against the pin 19 after its release.

The extreme outer edge 22 of the plate 15 is curved, as shown in Fig. 11, for a purpose which will fully appear hereinafter. Upon the arbor 11 and next to the segment-gear 13 upon the lever-arm 10 is the minute toothed segment, consisting of the curved arm 23, (see Fig. 3,) having the reverse curved extension 24, the outer operative edge of which is the segment of a circle the center of which is at the arbor 11, upon which it is pivoted. Starting from the outer end of the curved extension 24 are a series of teeth 25, fourteen in number. At the inner pivoted end of the arm 23 is the tapering curved tail 26. Near the base of the tail 26 is the spur 27, (see Fig. 3,) adapted for removable engagement with the curved end of the wire spring 28, the outer end of which is rigidly secured in the post 29. At the junction of the curved arm 23 and its curved extension 24 is located the pin 30. Next beyond the toothed segment 23 24 and mounted upon the arbor 11 is the metal washer 31, having the extension 32, with an open slotted end adapted for the reception of the rigid pin 33, which serves to hold the washer from lateral movement. Next beyond the washer 31 and pivoted upon the arbor 11 is the quarter toothed segment, consisting of the arm 34, having the segmental extension 35. The outer operative edge of this extension is the segment of a circle the center of which is at the arbor 11. Starting from the inner end of this segment are three sets of teeth 36, two in each set and at equal intervals apart. Beyond these teeth 36, also at equal intervals apart, are the three notches 37, 38, and 39.

40 is a curved slot open at its inner end concentric with the operative edge of the segmental extension 35, in which it is located, and about one-half the length of such extension.

41 is a pin upon the extension 35, located adjacent to the outer end of the slot 40.

At the inner pivoted end of the arm 34 is the curved tail 42, having its outer end curved abruptly in an upward direction. Near the base of the tail 42 is the spur 43, (see Fig. 2,) adapted for removable engagement with the curved end of the wire spring 44, the outer end of which is rigidly secured in the post 29. Next beyond the toothed segment 34 35 and mounted upon the arbor 11 is the metal washer 45, having the extension 46, with an open slotted end adapted for the reception of the rigid pin 33, which serves to hold the washer from lateral movement. Next beyond the washer 45 and pivoted upon the arbor 11 is the hour toothed segment, consisting of the arm 47, having the segmental extension 48. (See Fig. 1.) The outer operative edge of this extension is the segment of a circle the center of which is at the arbor 11. Starting from the inner end of this segment and extending the entire length of its operative edge are the series of teeth 49, fourteen in number.

50 is a pin upon the segmental extension 48, located near its inner end, as shown. At the inner pivoted end of the arm 47 is the tapering curved tail 51. Near the base of this tail is the spur 52, (see Fig. 1,) adapted for removable engagement with the curved end of the wire spring 53, the other end of which is rigidly secured in the post 29. Upon the outer end of the arbor 11 is the screw-threaded shoulder-washer 54, which serves to keep the series of toothed segments and their interposed washers upon the arbor 11 in sufficiently-close contact to permit of their free operative movement.

Referring to Fig. 4, 55 is a gear-wheel mounted upon the rigid arbor 56, which carries a ribbon-spring, (not shown,) the inner end of which is secured to the arbor 56 and the outer end to the gear-wheel 55. In front of the spring is the ratchet-wheel 57, also mounted upon the arbor 56. The spring-pawl 58 is pivoted to the gear-wheel 55 and is adapted for engagement with the ratchet-wheel 57. In rear of the ratchet-wheel 57 and rigidly secured thereto is the gear-wheel 59. Upon the outer end of the arbor 56 is the screw-threaded shoulder-washer 60, which serves to keep the ratchet and gear wheels in position upon the arbor. The gear-wheel 59 operates the geared retarding-train 61, as will be fully hereinafter explained.

Friction-tight upon the central arbor 3 and adjacent to the front wall 62 of the clock-casing 1 (see Figs. 5 and 13) is a coupler for operating the repeating mechanism, consisting of the disk 63, having the circular groove 64, which does not extend entirely around the disk. In the right-hand end of this groove is the slot 65. In the other end of the groove 64 is rigidly seated one end of a circular spring 66, which rests in such groove, its other end extending partly across the slot 65.

Upon the arbor 3, next adjacent to the disk coupler just described, is the sleeve 67, rigidly carrying upon its inner end the disk 68, having the three teeth 69, 70, and 71. (See Figs. 5 and 14.)

72 is a pin upon the disk 68, which passes into the slot 65 in the disk coupler 63. Upon the front end of this sleeve 67 is rigidly secured the series of minute-cams 73, four in number, all lying in the same plane. (See Figs. 5 and 8.) Upon one of these cams 73 is the aperture 74. It will be seen from the above description that the disk 68, the minute-cams 73, and the connecting-sleeve 67 are practically all in one piece and are loosely mounted upon the central arbor 3. Loosely mounted upon the arbor 3 and next to the minute-cams 73 are the quarter-cams 75, 76, 77, and 78. (See Figs. 5 and 7.) These cams are all in one piece and in the same plane. Upon the inner face of the cam 75 is the pin 79, which passes into the aperture 74 in one of the minute-cams 73, which practically locks these quarter-cams to the minute-cams upon the central arbor 3. Upon the rear end of the quarter-cam 75 is pivoted the pawl 80, which has the abutting edge 81, extending out beyond the cam 80, the inwardly-projecting point 82, and the upper spur 83 near the pivot-point. 84 is a curved spring rigidly secured at one end to the cam 75, its free end resting against the spur 83 of the pawl 80.

85 is a pin on the cam 75, which limits the outward movement of the pawl 80 under the action of the spring 84, as clearly shown in Fig. 7.

86 is a twelve-toothed disk loosely mounted upon the arbor 3 next to the quarter-cams 75, 76, 77, and 78.

Upon the arbor 3 and rigid with the twelve-toothed disk 86 is the hour-cam 87, consisting of a series of twelve circular steps 88, with decreasing radii, all having the same center. At the rear end of each step is an outwardly-projecting extension 89. Rigid with the hour-cam 87 and toothed disk 86 is the star-wheel 90, with twelve equidistant teeth 91. A spring 92 (see Fig. 12) has one of its ends rigid in the post 93 in the casing 2, its other end being provided with the angular V-shaped pawl 94, adapted for successive engagement in the spaces between the teeth 91 of the star-wheel 90.

The curved spring 95 (see Figs. 3 and 4) has one of its ends rigidly secured in the post 96, its other end being provided with the angular V-shaped pawl 97, adapted for successive engagement with the three teeth 69, 70, and 71 of the quarter-disk 68. The pin 98 limits the inward play of the V-shaped pawl 97.

Fig. 10 presents a perspective view of the individual spring-pressed pawls for engaging and holding the toothed segments when not in operation. 99, 100, and 101 are the pawls in question. These pawls are pivoted to the rigid arbor 102, and 103 103 are washers interposed between the pawls. The pawls are slightly curved to the left, having inclined pointed ends 104 and upper shoulder 105. 106 is a rigid post to which are secured the three flat springs 107, the free ends of which bear down upon the shoulders 105 of the pawls 99, 100, and 101. The releasing device for these pawls consists of the angular plate having the long lower arm 108 and the short upper arm 109. This releasing device is pivoted to the post 110 and has the rigid rod 111 extending across in front of the pawls. At the lower end of the arm 108 is the short pin 112, adapted for engagement with the spur 22 upon the carrier-arm 14. (See Fig. 11.) This releasing device 108 109 is within the clock-casing, the pin 112, just described, passing through the curved elongated slot 114 (see Fig. 4) in the division-wall 62 between the two casings.

The flat leaf-spring 115 has one end embedded in the outer end of the arm 109 of the releasing device, its other sliding loosely in the slotted post 116.

In Fig. 9 is shown in perspective the individual sliding spring-pressed hammer-trips and their attachments 117. 118 and 119 are the hammer-trips, each having a central elongated slot 120, an angular spring-seat 121 at one end, and a tapering projection 122 at its other end. These hammer-trips are pivoted upon the post 123, which passes through the elongated slots 120, which permits the hammer-trips to have a snug sliding motion upon the post 123. Washers are to be placed upon the post 123 between and on the outside of the hammer-trips to prevent lateral movement with respect to each other and to give them a snug working fit. These washers are not shown, for the reason that their presence would interfere with the clear position of the elongated slots. Upon the rigid post 124 are mounted the flat springs 125, three in number and of the same length, their free ends resting upon the spring-seats 121 of the hammer-trips and holding them in sliding contact with the bearing-post 126, which forms a front seat for the same.

128 is a pivoted arbor located just above the pointed ends of the hammer-trips. Upon the right-hand side of the arbor 128 are the inclined pins 129, adapted to receive the impulse of the sliding hammer-trips 117, 118, and 119. Upon the upper side of the pivoted arbor 128 is the rigid rod 130, carrying at its outer end the hammer 131, adapted for striking with the bell 132, mounted on the bracket 133. Another pin 134 is mounted on the pivoted arbor 128 and is adapted by its position to receive the lifting action of the flat spring 135, rigidly secured in the arbor 124. A cushion 136, of soft material, is placed just beyond the pivoted arbor to limit the downward stroke of the hammer.

137, 138, and 139 (see Fig. 4) are three studs rigid upon the division-wall 62 and all at the same radial distance from the arbor 11 as a center. These studs are adapted to depress the spring-pressed plate 15 as its rounded surface 22$^a$ passes in contact with the same, as will more fully hereinafter appear. These studs 137, 138, and 139 rise above the pin 112, projecting through the slot 114, so that the spring-pressed plate will not contact with the pin 112 in passing, such pin 112 being adapted for impact with the spur 22 on the arm 14.

Having described the working parts in detail, we will now proceed to show their operation.

The normal position of the lever 10 and its attached spring-carrier is shown in full lines in Figs. 1, 2, and 3. The outer end of the integral radial arm 14, upon which the spring-carrier is located, rests against the stop-pin 140. To start the repeating mechanism, the lever 10 is pushed down until it comes in contact with the stop-pin 141, as shown in dotted lines in Fig. 3 and in full lines in Fig. 4. In its downward movement the segmental gear 13 turns the gear-wheel 55 and winds the spring. The spring-pawl 58 rides over the teeth of the ratchet-wheel 57 until the lever 10 finishes its downward movement. The pawl 58 then drops into engagement with the last ratchet-tooth passed. On releasing the lever 10 the reflex action of the coiled spring carries the lever back to its normal position, and at the same time the pawl 58 turns its engaged ratchet and with it the attached gear-wheel 59, which in turn drives the geared train 61, which serves to steady the travel of the spring-carrier attached to the outer end of the radial arm 14, integral with the lever 10. In place of the geared retarding-train 61 a pneumatic device might be substituted for producing the same mechanical effect.

As the arm 14 swings upwardly the spur 22 thereon comes in contact with the pin 112 on the releasing device 108 109. This pin 112 is moved forward along the slot 114 and carries with it the releasing device. The pin 111, rigid upon the arm 108, is pressed against the spring-pressed pawls 99, 100, and 101, throwing them out of engagement with the teeth of the hour, quarter, and minute segments 48, 35, and 24, respectively, and thus permitting them to take their respective operative positions, as will be more fully explained hereinafter. On releasing the lever 10 the spring-carrier commences its forward travel to the right. As it reaches the pin 50 upon the hour toothed segment 49 the raised triangular carrier 17 strikes the pin 50 and carries the hour toothed segment with it against the action of its spring 53, causing each tooth 49, which is to the left of the contact end of the hammer-trip 117, to lift such hammer-trip against the action of its spring 125 and cause the tapering projection 122 to be slid up against the pin 136 upon the pivoted arbor 128. As the pin 136 is raised it lifts the hammer 131 away from the bell. As the tooth passes out of engagement with the hammer-trip the spring 124 restores the hammer-trip to its normal position, releases its contact with the pin 129, and permits the spring 135 to force the hammer 131 against the bell, the rod 130, carrying the bell, first striking the cushion 136. It will be seen that by reason of the elongated slots 120, through which the pivoting-pin 123 passes, the hammer-trip is given a sliding movement upon the pivoting-pin 123 and the bearing-post 126 during the striking action. As the toothed segment 48 is moved to its operative position by its spring 53 the teeth 49 of the segment 48 swing the hammer-trip 117 upon its pivot-pin 123 against the action of the spring 125, the tapering projection 122 swinging clear of the pin 129. By reason of the combined sliding and swinging motion of the hammer-trip it is impossible for the point of one of the teeth to become locked against the contact-point of the hammer-trip during the act of passing to ring the bell, for if a tooth should fall back and not clear the contact-point of the hammer-trip it would necessarily lock unless such hammer-trip were provided with a sliding and swinging motion, as shown. When the last tooth 49 has passed the hammer-trip 117, the stud 137 comes in contact with the extreme outer edge 22$^a$ of the plate 15, upon which the carrier 17 is located. The plate 15 is thus swung inwardly against the action of its spring 20, and the point 142 of the carrier 17 is pressed below the pin 50 on the toothed segment 47, thus releasing the carrier from engagement therewith. Just prior to the completion of this action the spring-pressed pawl 99 is ready for locking engagement with the forward tooth of the segment 48, such engagement being completed by the slight backward movement of the segment 48, caused by its spring 53. The spring-carrier is then ready for engagement with the pin 41. Upon the quarter toothed segment 35 (see Fig. 2) when it reaches the pin 41 it carries the quarter toothed segment along with it against the action of its spring 44 in the same manner as with the hour toothed segment 48. The teeth 36 for striking the quarters are arranged in pairs, as shown, with an extended interval of space between the same, the double tooth being employed to distinguish the striking of the quarter from that of the hour and minute. As the quarter-segment 35 is carried past its hammer-trip 118 it causes each pair of teeth 36, which are to the left of the contact end of its hammer-trip 118, to operate same and ring the bell twice for each quarter in the manner already described. As the last tooth 36 passes its hammer-trip 118 its spring-pawl 100 engages with the notch 37 and locks the toothed segment 35. The spring-carrier disengages itself with the toothed segment 35 just prior to the engagement of its spring-pawl 100 in the manner described in connection with the hour toothed segment 48. The spring-carrier now passes on and engages with the pin 30 upon the minute toothed segment 24, carrying it forward against the action of its spring 28 (see Fig. 3) in the same manner as with the two previous segments. The pins 50, 41, and 30 on the hour, quarter, and minute segments are of different lengths, with their inner ends all in the same plane, so that the triangular carrier 17 can positively engage with each pin as it reaches same. As the minute-segment 24 is carried past its hammer-trip 119 it causes each tooth 25 which is to the left of the contact end of its hammer-trip 119 to operate same and ring the bell once for each minute beyond the quarter last rung. As the last tooth 25 passes its hammer-trip 119 its spring-pawl 101 engages with the last tooth 25 and locks the segment 24. The spring-carrier disengages itself with the toothed segment 24 just prior to the engagement of its spring-pawl 101 in the manner described in connection with the hour toothed segment 48. The spring-carrier continues its travel until it comes in contact with the stop-pin 140. Passing to the series of cam on the central arbor 3, which operate in connection with the tails upon the hour, quarter, and minute toothed segments to regulate or determine their operative positions, we have indicated in Figs. 1, 2, and 3 these cams in their separate and relative positions for causing the bell to strike the twelve hours, the three-quarter, and the fourteen minutes to indicate 12.59 o'clock, or one minute to one o'clock. The coupler 63, (see Fig. 13,) friction-tight upon the central arbor 3, shows the pin 72 upon the three-toothed disk 68 pressed against the right-hand wall of the slot 65 and against the action of the spring 66. This serves to connect the central arbor 3 of the clock mechanism with the disk 68, and the minute-cam 73, being integral with the disk 68 by means of the intervening collar 67, (see Fig. 5,) therefore receives the impulse of the central arbor 3, as shown in Figs. 2 and 3 in full lines. The tail 26 of the minute toothed segment 24 is free to travel to the inner point of one of the arms of the cam 73, as shown in dotted lines in Fig. 3. This throws the minute-segment 24 also to the position shown in dotted lines in the same figure, or, in other words, to lift its hammer-trip 119 fourteen times to audibly indicate through the bell the proper number of minutes. The tail 42 of the quarter-segment 35 engages with one of the four cam-surfaces 75, 76, 77, and 78 to determine the operative position of the pairs of teeth 36 of the segment 35. In Fig. 2 the tail 42 is shown free to travel to the lowest cam-surface 78, which would result in throwing the segment 35 over to the left until all three pairs of teeth 36 have passed the hammer-trip 118, so that in the return movement of the segment three double rings of the bell are sounded to indicate the three-quarters. The tail 51 of the hour-segment 48 engages with one of the steps 88 of the hour-cam 87 to determine the operative position of the teeth 49 on the segment 48. In Fig. 1 the tail 51 is shown free to travel by the action of its spring 53 up to the last step or that with the shortest radius. This movement of the tail will result in throwing the toothed segment 48 twelve teeth to the left of the hammer-trip 117, so that in the return movement of the segment twelve rings of the bell are sounded to indicate the proper hour. It will thus be seen that the positions of the three cams and their resultant effect upon the three toothed segments, as has just been described, will cause the bell to indicate the hour of 12.59, or one minute of one o'clock.

The twelve-toothed disk 86 (see Fig. 7) is engaged with the pawl 80 during the conditions just described and is thrown into such engagement by the abutting edge 81 of the pawl 80 striking the abutment 144, mounted upon the casing. (See Fig. 2.) As the quarter-cam 75, 76, 77, and 78, to which the pawl 80 is pivoted, travels around it moves the disk 86, which in turn carries with it the hour-cam 87 and star-wheel 90, which are both rigid with such disk. Such movement is continued until one of the teeth 91 of the star-wheel 90 passes the angular V-shaped pawl 94. Under these conditions it will continue to strike "15.59" as often as the lever is pulled down until one of the teeth 91 passes the angular V-shaped pawl 94, which is then forced in between that tooth and the next, causing the star-wheel to jump forward, and with it the disk 86 and hour-cam 87. This movement carries the curved step of cam 87 with the longest radius in front of the tail 51 of the hour-segment 48, which permits only one tooth of the segment to engage its hammer-trip, and consequently only one bell is struck. Simultaneously with the jumping forward of the star-wheel 90 comes a similar movement of the quarter and minute cams and the three-toothed disk 68 under the action of the spring 66, such movement extending to the opposite wall of the slot 65. At the same instant the pawl 80 is carried out of engagement with the abutment 144, and consequently disengages itself from the disk 86ⁿ through the action of its spring 84. The jumping forward of the quarter and minute cams, as just described, is about one-sixtieth of the circle surrounding the minute-cam. In such positions the highest points of both cams are presented to tails 42 and 26 of the segments 34 and 23. Under this condition the quarter and minute segments are held by the engaged tails, thus preventing any of their teeth from passing their hammer-trips. Consequently no bells are struck for the quarter or minutes. Now on pulling down the lever 10 only one bell is struck, and that by the hour-segment, thus indicating one o'clock. At fourteen minutes past one one tooth of the hour-segment passes its hammer-trip into operative position. The quarter-segment remains out of engagement with its hammer-trip, as at one o'clock, previously described, and the tail of the minute-segment 24 is in engagement with the inner end of the operative curve of one of the minute-cams, as shown in dotted lines in Fig. 3. This permits all of the fourteen teeth of the minute-segment to pass its hammer-trip 101 into operative position. On pulling down the lever 10 one bell is struck by the hour-segment, no bells by the quarter-segment, and fourteen bells by the minute-segment, thus indicating fourteen minutes past one. At this point the tooth 71 on the disk 68 comes in contact with the V-shaped pawl 97. As the movement continues the pin 72 on the disk 68 is forced back against the action of the spring 66 until it strikes the right-hand wall of the slot 65. Under these conditions it will continue to strike fourteen minutes past one until the tooth 71 passes the V-shaped pawl 97. The quarter and minute cams are then jumped forward by the double action of the springs 95 and 66. Under these conditions the minute-segment is safely held from operative engagement and the tail of the quarter-segment 42 is free to pass down upon the surface 76 of the quarter-cam. Now on pulling down the lever 10 one bell is struck by the hour-segment, two bells are struck by the quarter-segment, indicating one-quarter of an hour, and no minutes are struck by the minute-segment, the hour indicated being one-quarter of an hour past one. Should the change in connection with the three-toothed disk 68 take place just after the lever 10 has been pulled down, the tail 42 of the quarter-segment 35 is prevented from accidentally reaching a lower step by reason of the position of the tail 26 of the minute-segment 24, as shown in dotted lines in Fig. 3, such position preventing a further movement of the quarter-cam, and with it the minute-cam, which is rigidly connected thereto. This result may be also accomplished by the presence of the additional notches 38 and 39 in the outer edge of the quarter-segment 35, which are adapted for automatic locking engagement with the spring-pawl 100 during its backward movement. Should the star-wheel 90 change its position just after the downward stroke of the lever 10 at any hour, the outwardly-extending projection 89 at the end of each circular step will prevent the tail 51 of the hour-segment 48 from prematurely reaching the next succeeding step. The wall 145 on the hour-cam between the circular step having the shortest radius and the next step having the longest radius serves in the same capacity as any one of the outwardly-extending projections 89.

While we have shown the above-described mechanism as applied directly to a clock, it is apparent that such mechanism could also be applied and combined with the mechanism of a watch.

We claim—

1. A repeating mechanism for clocks and watches consisting essentially of a pivoted operating-lever-spring carrier upon the operating-lever, hour, quarter and minute toothed segments pivoted on a common axis with the operating-lever and adapted for operative engagement with the spring-carrier tails upon the inner ends of the toothed segments, hour, quarter and minute cams pivoted upon the central clock-arbor and adapted for operative engagement with the tails upon the toothed segments means for holding the toothed segments when not in operation and for releasing the same, a bell and interposed means between the bell and toothed segments for ringing the same.

2. A repeating mechanism for clocks and watches consisting essentially of a retarding-train a pivoted operating-lever connected with the retarding-train, a spring-carrier upon the operating-lever, hour, quarter and minute toothed segments pivoted on a common axis with the operating-lever and adapted for operative engagement with the spring-carrier, tails upon the inner ends of the toothed segments, hour, quarter and minute cams pivoted upon the central clock-arbor and adapted for operative engagement with the tails upon the toothed segments, means for holding the toothed segments when not in operation and for releasing the same a bell and interposed means between the bell and toothed segments for ringing the same.

3. A repeating mechanism for clocks and watches consisting essentially of a retarding-train a pivoted operating-lever connected with the retarding-train a spring-carrier upon the operating-lever, hour, quarter and minute toothed segments pivoted on a common axis with the operating-lever and adapted for operative engagement with the spring-carrier, tails upon the inner ends of the toothed segments, hour, quarter and minute cams pivoted upon the central clock-arbor and adapted for operative engagement with the tails upon the toothed segments, a coupler-disk upon the central clock-arbor provided with a circular groove, a circular spring within the groove and a slot through the disk at the free end of the spring a toothed quarter-disk rigid with the minute-cam and provided with a pin adapted for movement in the slot of the coupler-disk and against its spring, a spring V-shaped pawl adapted for engagement with the teeth on the quarter-disk means for holding the toothed segments when not in operation and for releasing the same a bell and interposed means between the bell and toothed segments for ringing the same all combined and operating as and for the purpose stated.

4. A repeating mechanism for clocks and watches consisting essentially of a retarding-train a pivoted operating-lever connected with the retarding-train a spring-carrier upon the operating-lever, hour, quarter and minute toothed segments pivoted on a common axis with the operating-lever and adapted for operative engagement with the spring-carrier, tails upon the inner ends of the toothed segments, hour, quarter and minute cams pivoted upon the central clock-arbor and adapted for operative engagement with the tails upon the toothed segments, a twelve-toothed disk upon the central clock-arbor and adjacent to the quarter-cam, a spring-pawl pivoted upon the quarter-cam and adapted for operative engagement with the twelve-toothed disk, a twelve-toothed star-wheel upon the central clock-arbor and rigid with the hour-cam and the twelve-toothed disk, a spring V-shaped pawl adapted for operative engagement with the star-wheel, an abutment on the casing for operative engagement with the spring-pawl on the quarter-cam, means for holding the toothed segments when not in operation and for releasing the same a bell and interposed means between the bell and toothed segments for ringing the same all combined and operating as and for the purpose stated.

5. A repeating mechanism for clocks and watches consisting essentially of a retarding-train a pivoted operating-lever connected with the retarding-train a spring-carrier upon the operating-lever, hour, quarter and minute toothed segments pivoted on a common axis with the operating-lever and adapted for operative engagement with the spring-carrier, tails upon the inner ends of the toothed segments, hour, quarter and minute cams pivoted upon the central clock-arbor and adapted for operative engagement with the tails upon the toothed segments, a coupler-disk upon the central clock-arbor provided with circular groove, a circular spring within the groove and a slot through the disk at the free end of the spring, a toothed quarter-disk rigid with the minute-cam and provided with a pin adapted for movement in the slot of the coupler-disk and against its spring, a spring V-shaped pawl adapted for engagement with the teeth of the quarter-disk, a twelve-toothed disk upon the central clock-arbor and adjacent to the quarter-cam, a spring-pawl pivoted upon the quarter-cam and adapted for operative engagement with the twelve-toothed disk, a twelve-toothed star-wheel upon the central clock-arbor and rigid with the hour-cam and the twelve-toothed disk, a spring V-shaped pawl adapted for operative engagement with the star-wheel, an abutment on the casing for operative engagement with the spring-pawl on the quarter-cam, means for holding the toothed segments when not in operation and for releasing the same a bell and interposed means between the bell and toothed segments for ringing the same all combined and operating as and for the purpose stated.

6. A repeating mechanism for clocks and watches consisting essentially of a pivoted operating-lever carrying an integral segment-gear, a retarding-train in engagement with the segment-gear on the operating-lever, and an integral radial arm provided at its outer end with a spring-carrier, hour, quarter and minute toothed segments pivoted on a common axis with the operating-lever and adapted for operative engagement with the spring-carrier, tails upon the inner ends of the toothed segments, hour, quarter and minute cams pivoted upon the central clock-arbor and adapted for operative engagement with the tails upon the toothed segments, individual spring-pressed pawls for engaging and holding the toothed segments when not in operation, a releasing device for disengaging the spring-pawls from the toothed segments to permit them to operate, individual sliding and swinging spring-pressed hammer-trips adapted for operative engagement with the toothed segments and the bell-hammer for audibly indicating the hour, quarter and minute.

7. In a repeating mechanism for clocks and watches the combination with the coupler-disk 63 upon the central clock-arbor provided with the circular groove 64, the circular spring 66 within the groove 64 and the slot 65 within the disk, of the quarter-disk 68 provided with the three teeth 69, 70 and 71, the spring V-shaped pawl 95, 97, adapted for operative engagement with the teeth 69, 70 and 71, the pin 72 on the quarter-disk 68 adapted for movement in the slot 65 of the coupler-disk 63 and against the spring 66 and the minute-cam 73 rigid with the quarter-disk, for jumping the minute-cam forward so that it can safely hold the tailpiece of the minute-segment 24 and prevent the teeth of such segment from passing the hammer-trip 119.

8. In a repeating mechanism for clocks and watches the combination with the star-wheel 90 having teeth 91, the spring V-shaped pawl 92, 94, the hour-cam 87 and the twelve-toothed disk 86, of the quarter-cam 75, 76, 77, 78, the spring-pawl 80 pivoted to the quarter-cam, and the abutment 144 mounted upon the casing, the star-wheel, hour-cam and twelve-toothed disk being rigidly connected all operating to jump the hour-cam, one step forward for one complete revolution of the central clock-arbor upon which it is mounted.

9. In a repeating mechanism for clocks and watches the combination with the star-wheel 90 having teeth 91, the spring V-shaped pawl 92, 94, the hour-cam 87 having the circular steps 88 each provided with the end extensions 89 and the twelve-toothed disk 86, of the quarter-cam 75, 76, 77, 78 the spring-pawl 80 pivoted to the quarter-cam and the abutment 144 mounted upon the casing, the star-wheel, hour-cam and twelve-toothed disk being rigidly connected all operating to jump the hour-cam one step forward for one complete revolution of the central clock-arbor upon which it is mounted.

10. In a repeating mechanism for clocks and watches the combination with the coupler-disk 63 upon the central clock-arbor, provided with the circular groove 64, the circular spring 66 within the groove 64 and the slot 65 within the disk of the quarter-disk 68 provided with the three teeth 69, 70 and 71, the spring V-shaped pawl 95, 97, adapted for operative engagement with the teeth 69, 70 and 71, the pin 72 on the quarter-disk 68 adapted for movement in the slot 65 of the coupler-disk 63 and against the spring 66, the minute-cam 73 rigid with the quarter-disk and provided with the orifice 74, and the quarter-cam 75, 76, 77, 78, rigid with the minute-cam 73 and provided with the pin 143 adapted for engagement with the orifice 74 in the minute-cam 73, all operating to jump the quarter-cam forward so that the proper cam-surface will be safely presented to the tail 42 of the quarter-segment 35.

11. In a repeating mechanism for clocks and watches the combination with the hour-segment having the pin 50, the quarter-segment having the pin 41, the minute-segment having the pin 30, and the studs 137, 138 and 139 on the casing, of the spring-carrier upon the outer end of the radial arm 14 consisting of the plate 15 pivoted upon the radial arm 14 and having the curved outer edge 22$^a$ and the raised triangular carrier 17 at one end of same, the right-angled arm 18 of the plate 15 carrying the spring 20 working loosely in the post 21, the triangular carrier being adapted for successive engagement with the pins 50, 41, and 30 and the curved outer edge 22$^a$ of the plate 15 being adapted for contact with the studs 137, 138 and 139 substantially as and for the purpose stated.

12. In a repeating mechanism for clocks and watches the combination with the spring-pawls 99, 100 and 101 adapted for holding engagement with the hour, quarter and minute segments of the releasing device consisting of the angular plate having the long lower arm 108 and the short upper arm 109, the rigid rod 111 extending across in front of the pawls, the short pin 112 adapted for engagement with the spur 22 upon the radial arm 14 upon which the spring-carrier is mounted all operating substantially as and for the purpose stated.

13. In a repeating mechanism for clocks and watches the combination with the toothed hour, quarter and minute segments and the pin 127 upon the casing of the spring-pressed hammer-trips 117, 118 and 119 provided with the central elongated slots 120 the angular spring-seats 121 at one end and the tapering projections 122 at their other ends, the post 123 upon which the hammer-trips have a sliding and swinging motion, the spring-pressed pivoted arbor 128 having the inclined pins 129 adapted to receive the impulse of the sliding hammer-trips and the hammer 130, 131, rigid upon the pivoted arbor all operating substantially as and for the purpose stated.

14. In a repeating mechanism for clocks and watches the combination with the hour, quarter and minute segments of the washers 31 and 45 interposed between the segments and provided with the extensions 32 and 46 with open slotted ends and the rigid pin 33 on the casing adapted for holding engagement with the slotted ends of the washer extensions substantially as and for the purpose stated.

In testimony whereof we have signed our names to this specification in the presence of two subscribing witnesses.

HARLOW W. BAILEY.
WILLIAM J. PARKINSON.

Witnesses:
L. NEUBECK,
W. T. MILLER.